US00RE44502E

(19) United States
(12) Reissued Patent
Boesch et al.

(10) Patent Number: US RE44,502 E
(45) **Date of Reissued Patent: *Sep. 17, 2013**

(54) SYSTEM AND METHOD FOR MULTI-CURRENCY TRANSACTIONS

(75) Inventors: Brian Paul Boesch, Herndon, VA (US); Stephen David Crocker, Bethesda, MD (US); Donald Eggleston Eastlake, III, Carlisle, MA (US); Alden Sherburne Hart, Jr., Arlington, VA (US); Andrew Jackson, Falls Church, VA (US); Robert A. Lindenberg, Sudburn, MA (US); Denise Marie Paredes, Centreville, VA (US)

(73) Assignees: Paypal, Inc., San Jose, CA (US); Paypal International Limited, Dublin (IE)

( * ) Notice: This patent is subject to a terminal disclaimer.

(21) Appl. No.: 12/855,603

(22) Filed: Aug. 12, 2010

Related U.S. Patent Documents

Reissue of:

(64) Patent No.: 6,205,433
Issued: Mar. 20, 2001
Appl. No.: 09/213,590
Filed: Dec. 17, 1998

U.S. Applications:

(63) Continuation of application No. 10/390,540, filed on Mar. 18, 2003, now Pat. No. Re. 41,619, which is a continuation of application No. 08/663,896, filed on Jun. 14, 1996, now Pat. No. 5,897,621.

(51) Int. Cl.
*G06Q 30/06* (2012.01)

(52) U.S. Cl.
USPC ..... 705/27.1; 705/37; 705/39; 705/42

(58) Field of Classification Search
USPC ..... 705/26.1, 37, 39, 42, 26.82, 38, 43; 235/379, 380
See application file for complete search history.

(56) References Cited

U.S. PATENT DOCUMENTS 3,652,795 A 3/1972 Wolf et al. ..... 705/42 X
4,251,867 A 2/1981 Uchida et al. ..... 705/39

(Continued)

FOREIGN PATENT DOCUMENTS

DE 4308597 A1 8/1993
EP 251619 A2 1/1988

(Continued)

OTHER PUBLICATIONS

Lee et al.; "Considering exchange rate movements in economic evaluation of foreign direct investments", Engineering Economist, v40n2 pp. 171-199, 1995.*

(Continued)

*Primary Examiner* — Jagdish Patel
(74) *Attorney, Agent, or Firm* — Kenyon & Kenyon LLP

(57) ABSTRACT

A system and method for determining approval of a multi-currency transaction between a customer and a merchant over a network. The system includes a customer computer which is connected to a communication network, a merchant computer which is connected to the communication network, and a server connected to both the customer computer via the communication network and to the merchant computer via the communication network. The customer computer includes a first set of data which contains an amount the customer is willing to pay the merchant for a product in a first currency. The merchant computer includes a second set of data which contains a product price at which the merchant agrees to sell the product in a second currency. The server receives the first set of data and the second set of data. The server then converts the amount in the first currency into a converted amount in the second currency. The server approves the transaction if the converted amount in the second currency is within a risk range of the product price in the second currency in accordance with current exchange rates. Once the transaction is approved, the approving entity may settle the transaction at its discretion thereby bearing the risk associated with currency exchange. The parties, however, incur no risk. The customer will pay the amount in the first currency and the merchant will receive the price in the second currency. These are values known and agreed to by the parties at the time of the transaction.

20 Claims, 2 Drawing Sheets

(56) References Cited

U.S. PATENT DOCUMENTS

| | | | | |
|---|---|---|---|---|
| 4,766,293 | A | 8/1988 | Boston | |
| 4,812,628 | A | 3/1989 | Boston et al. | 705/38 |
| 4,823,264 | A | 4/1989 | Deming | 705/39 |
| 4,837,422 | A | 6/1989 | Dethloff et al. | 235/380 |
| 4,877,947 | A | 10/1989 | Mori | 235/379 X |
| 5,369,705 | A | 11/1994 | Bird et al. | 380/21 |
| 5,440,634 | A | 8/1995 | Jones | 235/379 X |
| 5,453,601 | A | 9/1995 | Rosen | 235/379 |
| 5,455,407 | A | 10/1995 | Rosen | 235/380 |
| 5,535,276 | A | 7/1996 | Ganesan | 380/25 |
| 5,557,518 | A | 9/1996 | Rosen | 235/379 X |
| 5,659,165 | A | 8/1997 | Jennings et al. | 235/379 |
| 5,671,364 | A * | 9/1997 | Turk | 705/39 |
| 5,687,323 | A | 11/1997 | Hodroff | 235/380 X |
| 5,715,399 | A | 2/1998 | Bezos | 235/379 X |
| 5,729,594 | A | 3/1998 | Klingman | 379/93.12 |
| 5,774,553 | A * | 6/1998 | Rosen | 380/49 |
| 5,787,402 | A * | 7/1998 | Potter et al. | 705/37 |
| 5,826,241 | A | 10/1998 | Stein et al. | |
| 6,892,184 | B1 * | 5/2005 | Komem et al. | 705/26.41 |
| 7,328,188 | B1 * | 2/2008 | Barry | 705/40 |

FOREIGN PATENT DOCUMENTS

| | | |
|---|---|---|
| EP | 0 254 812 | 2/1988 |
| EP | 542298 A2 | 5/1993 |
| EP | 590861 A2 | 4/1994 |
| GB | 2 261 579 | 5/1993 |
| GB | 2 296 413 | 6/1996 |
| GB | 2 301 919 | 12/1996 |
| WO | WO 91/16691 | 10/1991 |
| WO | WO 95/12169 | 5/1995 |
| WO | WO 96/33568 | 10/1996 |
| WO | WO 96/36024 | 11/1996 |
| WO | WO 99/41315 | 12/1996 |
| WO | WO 97/04411 | 2/1997 |
| WO | WO 97/43727 | 11/1997 |
| WO | WO 97/48078 | 12/1997 |

OTHER PUBLICATIONS

"RSA" Signs Deal With China:, Internet Week, vol. 2, No. 7, (Feb. 12, 1996).

Cohen, Jackie, "Citibank's Bid To Be The King of Cash," Bank Technology News, vol. 9, No. 9, (Sep. 1996), pp. 9-12.

PSINet Teams With WorldPay Ltd. to Launch the Worlds, First Secure Multi-Currency Solution for International Electronic Commerce, PR Newswire, Oct. 6, 1997.

McDougall, Bruce, "Electronic Evolution," Canadian Banker, vol. 102, No. 5, (Sep./Oct. 1995), pp. 28-33.

Bers, Joanna Smith, "Cyberspace: The New Promised Land," Bank Systems & Technology, vo.. 32, No. 7, (Jul. 1995), pp. 32-37.

* cited by examiner

SYSTEM AND METHOD FOR MULTI-CURRENCY TRANSACTIONS

Matter enclosed in heavy brackets [ ] appears in the original patent but forms no part of this reissue specification; matter printed in italics indicates the additions made by reissue.

*RELATED APPLICATIONS*

*This is a continuation reissue application of U.S. Reissue application Ser. No. 10/390,540 filed Mar. 18, 2003, now U.S. Pat. No. RE41,619, which issued Aug. 31, 2010 as a reissue of U.S. Pat. No. 6,205,433, issued Mar. 20, 2001, which is a continuation of U.S. application Ser. No. 08/663,896 filed Jun. 14, 1996, issued Apr. 27, 1999, now U.S. Pat. No. 5,897,621. The contents of each of these patents are incorporated herein by reference.*

This application is a continuation of patent application Ser. No. 08/663,896, filed Jun. 14, 1996, now allowed, the disclosure of which is incorporated by reference herein, in its entirety.

BACKGROUND OF THE INVENTION

1. Field of Invention

The present invention generally relates to a system and method for approving a transaction over a communications network between a merchant and a customer. More specifically, the present invention is directed to a system and method for approving a transaction between a merchant and a customer, wherein the transaction occurs over an electronic network (such as the Internet) and wherein the customer pays for a product using electronic cash in one currency and the merchant receives electronic cash for the product in a different currency.

2. Description of the Prior Art

Soon, international commerce may be a common experience for almost everyone. This is due, in large measure, to computer networks, including the Internet, which link individuals, consumers, businesses, financial institutions, educational institutions, and government facilities. In fact, the growth in international commerce appears limitless given the forecasts relating to the commercial use of the Internet and the like.

There is a problem, however, inherent in international commerce, electronic or otherwise. The problem exists, for the most part, because monetary systems differ from country to country. That is, money is generally expressed in different currencies in different countries and the value of the different currencies vary greatly. Currency conversion is widely used to convert money from one currency into money of a different currency.

As used herein, the term "currency" includes, but is not limited to, denominations of script and coin that are issued by government authorities as a medium of exchange. A "currency" also may include a privately issued token that can be exchanged for another privately issued token or government script. For example, a company might create tokens in various denominations. This company issued "money" could be used by employees to purchase goods from merchants. In this case, an exchange rate might be provided to convert the company currency into currencies which are acceptable to merchants.

In each instance, currency conversion represents a significant economic risk to both buyers and sellers in international commerce. For example, assume a customer desires to buy a product from a merchant. Further consider the scenario where the customer pays his credit card bills in U.S. dollars and the merchant only accepts French francs for the products he sells. The customer uses his credit card to pay the merchant for the product. The merchant receives French francs.

Typically, at an undetermined later date, the company issuing the credit card would bill an amount to the customer in U.S. dollars. The amount billed to the customer is determined by an exchange rate used at the time the credit card company settles the transaction. This settlement is often at an indeterminate time and could be on the date of purchase or several days or weeks later. The time of this settlement is at the credit card company's discretion. The risk to the credit card company is minimal because the credit card company can settle the transaction when exchange rates are favorable. Thus, in this case, it is the customer who bears the risk that the value of the customer's currency will decline prior to this settlement.

As another example, consider a cash transaction where a merchant accepts a currency other than that of his country's currency. In this case, the merchant sells the currency to a currency trader, usually at a discount. The price the merchant charges to the customer who pays cash reflects both the cost of currency conversion (the discount) and the risk that the rate used to establish the price of the product in a particular currency may have changed. This results in the customer paying a higher price for the product and the merchant incurring risk due to a possible change in currency exchange rates.

Thus, the described post sale methods of currency exchange may impart significant risk upon the customer and the merchant. Risk is typically on the side of whoever commits to the currency conversion. Specifically, in a cash transaction, the customer bears the risk when currency is converted prior to purchasing a product. The merchant sustains the risk when he converts the customer's currency into his own currency. Also, in the case of transactions on the scale of a few cents, the cost of currency conversion may be greater than the currency is worth.

As yet another example, consider the risks that an individual assumes when he converts from the currency of his country ("native currency") to a different second currency. In this case, the individual can purchase goods at a price in the second currency, but cannot be certain of the value of the second currency relative to his native currency. In this case, the currency exchange has occurred pre-sale. Thus, the individual assumes the risk of devaluation of the second currency against the first currency. Further, the customer bears the risk that the second currency may cease to be convertible into his native currency.

It is noted that if the individual desires to purchase an item in a third currency which differs from the native and second currencies, he must undertake at least one additional currency conversion (converting either his native currency to the third currency, the second currency to the third currency, or a combination of both). In this case, the customer assumes an additional risk.

The present invention recognizes that international commerce over electronic networks, such as the Internet, cannot reach potential unless customer and merchant obligations relating to transactions are fixed at the time of the transaction so that the risk to these parties associated with currency exchange is minimized Thus, what is needed to encourage the development of international commerce over such networks is a system and method that offers a means of eliminating the uncertainty associated with multi-currency transactions. One aspect of the present invention is the shift of the risk associated with currency exchange from both the merchant and customer to a third party (e.g., a server) in real time. This server may assume the risk itself or may choose to subsequently pass on the risk to a fourth party (e.g., a bank or other financial institution).

SUMMARY OF INVENTION

The present invention is directed to a system for determining approval of a transaction between a merchant and a customer. The system comprises a customer device (e.g., a computer) associated with the customer. The customer device has a first set of data including an amount in a first currency. The system also has a merchant device (e.g., a computer) associated with the merchant. The merchant device has a second set of data including a product price in a second currency. The system further has a server device connected to both the customer device and the merchant device for receiving the first and second sets of data and for approving the transaction when the amount in the first currency is within a risk range of the product price in the second currency in accordance with current exchange rates.

Another aspect of the present invention is directed to a system for determining approval of a transaction between a customer and a merchant where the product price is known by the customer. The transaction includes the merchant providing a product price in a second currency. The system comprises a customer device (e.g., a computer) associated with the customer. The customer device has a first set of data including an amount in a first currency. The system also includes a server connected to the customer device. The server is able to access the product price in the second currency, receive the first set of data from the customer device, and can approve the transaction when the amount in the first currency is within a risk range of the product price in the second currency in accordance with current exchange rates.

Still another aspect of the present invention is directed to a method for determining approval of a transaction between a customer having a customer device (e.g., a computer) and a merchant having a merchant device (e.g., a computer). The customer device and the merchant device are connected to a server. The customer device has a first set of data including an amount in a first currency. The method comprises transmitting a second set of data from the merchant device to the customer device which receives the second set of data from the merchant device. The second set of data includes the product price in a second currency. The method further includes transmitting the first and the second sets of data by the customer device to the server and the server receiving the transmitted first and second sets of data. The server is for approving the transaction when the amount in the first currency is within a risk range of the product price in the second currency in accordance with current exchange rates.

BRIEF DESCRIPTION OF DRAWINGS

Representative embodiments of the present invention will be described with reference to the following drawings.

DETAILED DESCRIPTION OF THE PREFERRED EMBODIMENTS

Reference is now made to the figures for the purpose of describing, in detail, the preferred embodiments of the present invention. The figures and accompanying detailed description are not intended to limit the scope of the claims appended hereto.

Figure 1:
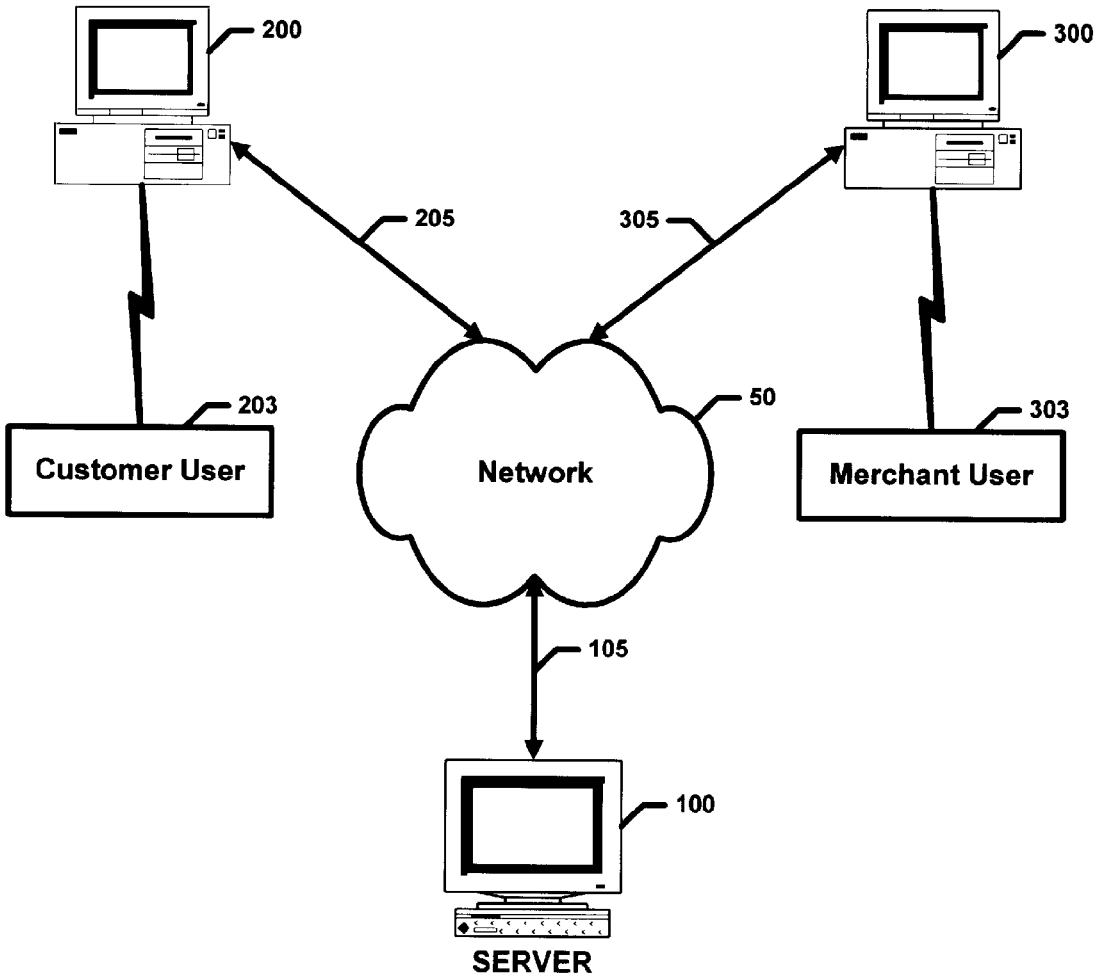
FIG. 1 is a diagrammatic representation of one aspect of the present invention.

The preferred architecture of the present invention is generally depicted in FIG. 1. FIG. 1 shows three entities: a server 100, a customer computer 200, and a merchant computer 300, connected to each other via a network 50. Network 50 can be a private, public, secure, or an insecure network, such as the Internet, an intranet, and/or a Local Area Network (LAN). In the preferred embodiment, an insecure network, such as, the Internet is used. The connections to network 50 are identified by lines 105, 205, and 305, respectively, and are well known in the art.

Merchant computer 300 represents the computer of an individual, for example, merchant user 303, who sells products via network 50. A "product" can include goods, services, information, data, and the like. Customer computer 200 represents the computer of an individual, for example, a customer user 203, who wants to buy a product (or products) from merchant user 303 over network 50. The mechanism of delivery of the product is not a part of this patent. Product delivery could be coincident with payment, before payment, or after payment.

Server 100 represents a computer of an entity who processes transactions between customer user 203 and merchant user 303. Server 100 has a database which includes at least one customer account in a first currency associated with customer user 203 and at least one merchant account in a second currency associated with merchant user 303. The first currency differs from the second currency.

In the preferred embodiment, the accounts store electronic funds of the parties, for example, electronic cash. The electronic funds are a representation of funds (real cash, credit, and the like).

Server 100 also has its own server accounts. The server accounts are in currencies corresponding to the currencies of the customer and merchant accounts. The server accounts represent real cash, credit, and the like. The server accounts correspond to the electronic funds stored in the customer and merchant accounts.

In the preferred embodiment, local accounts are maintained at customer computer 200 and merchant computer 300. The local accounts represent the electronic funds in the customer account and the merchant account maintained at server 100, respectively. The local accounts of the customer and the merchant are sometimes referred in the art as "wallets" and "cash registers," respectively. The server accounts may be arranged with a bank or other financial institution.

The following example is used to illustrate how these accounts can be set up: customer user 203 lives in the U.S. and purchases products using U.S. dollars (first currency) and merchant user 303 is located in France and conducts his operations in French francs (second currency). Server 100 includes a customer account in U.S. dollars and a merchant account in French francs. Server 100, which processes the transactions between these parties, further includes two electronic accounts representing all user accounts whose currencies are in dollars and all user accounts whose currencies are in francs. Server 100 also includes two accounts in a bank with one server account in U.S. dollars and the other server account in French francs.

Although the system can operate using an unsecured network 50, in the preferred embodiment, if network 50 is insecure, measures are taken to assure that server 100, customer computer 200, and merchant computer 300 can communicate securely over network 50. Central to achieving such security while maintaining a high performance payment system is the use of "sessions." A session is an opportunity (or window) in which customer user 203 may purchase a product from merchant user 303 over the network 50 or which merchant user 303 sells a product to customer user 203 over network 50. By using a session, a merchant can securely communicate with a customer over an insecure network. Customer user 203 and merchant user 303 each have their own independent sessions. Sessions are of limited duration which is governed by predetermined parameters. In the preferred embodiment, these parameters are set by customer user 203 and merchant user 303. However, server 100 can set or limit values of such parameters.

In the preferred embodiment, the parameters relating to the session of customer user 203 limit an amount of electronic funds ("session amount"), a maximum amount of time that the session can last, and a maximum number of transactions that can be conducted. The session amount is the maximum amount of electronic funds that customer user 203 can spend during the customer's session. Also in the preferred embodiment, the session of merchant user 303 is limited by a maximum amount of time that the merchant's session can last and a maximum number of transactions that merchant user 303 can conduct.

To accomplish such secure communication over the insecure network, a first session associated with customer user 203 is created. The first session has first use parameters for limiting the duration that the first session can be used and a set of customer data. The first use parameters and the set of customer data are identifiable by server 100. A second session associated with merchant user 303 is also created. The second session has second use parameters for limiting the duration that the second session can be used and a set of merchant data. The second use parameters and the set of merchant data are identifiable by server 100. Over the insecure network, a portion of the first session and a portion of the second session are linked. The portion of the first session includes the set of customer data and the first use parameters. The set of customer data may include a customer identification string which identifies customer user 203. The portion of the second session includes the set of merchant data and the second use parameters. The set of merchant data may include a merchant identification string which identifies merchant user 303. Server 100 verifies customer user 203 and merchant user 303 based upon at least portions of the set of customer data and the set of merchant data and determines that the first and second sessions can be used. In this manner, confidential details of the payment between customer user 203 and merchant user 303 are assured of being communicated securely. This procedure of establishing secure communication is more fully set forth in co-pending U.S. patent application, Ser. No. 08/572,425, filed on Dec. 14, 1995, and entitled "Electronic Transfer and Method" which is incorporated herein by reference. Of course, other methods and systems for establishing secure communication over an insecure network may be used to use the invention set forth herein.

Merchant user 303 and customer user 203 endeavor ultimately to effect a "transaction," that is, the purchase of a product by customer user 203 from merchant user 303. Merchant user 303 and customer user 203 do not require any prior existing relationship to transact business. This is so because merchant user 303 and customer user 203 each have a preestablished relationship with server 100 prior to transacting business.

How the parties form this relationship is not part of the present invention. Rather, what is important is that the customer and merchant accounts, described above, exist within server 100. In the preferred embodiment, to form the relationship, customer user 203 provides information using customer computer 200 to server 100. Such information can include the name of customer user 203 and the currency in which he intends to purchase products. In the case of merchant user 303, this information can include the name of merchant user 303 and the currency in which merchant user 303 intends to ultimately receive for providing products. Other information can be provided as deemed necessary by server 100.

This relationship may be either direct or indirect. An indirect relationship, for example, would include the situation where one or more entities, previously known to server 100, vouch for merchant user 303 and/or customer user 203. Public key cryptographic systems are generally used in this type of vouching process and are well known to those skilled in the art. The process of using public key cryptographic systems as such is known in the art as "certificate management." In this case, vouching entities are known as "certificate authorities." Certificates, certificate management, and certificate authorities are well known in the art and are used by but are not the subject of the present invention.

The present invention is directed toward "approval" of a multi-currency transaction in which customer user 203 pays in a first currency and merchant user 303 accepts the payment in a second currency which differs from the first currency, rather than the completed transaction itself. As will be described below, approval commits customer user 203 and merchant user 303 to the terms of the transaction and commits server 100 to perform virtual settlement of the transaction.

As used herein, "virtual settlement" of the transaction represents at least the movement of electronic funds to a merchant account of merchant user 303 held by server 100. It can also represent the movement of electronic funds from a customer account of customer user 203 held by server 100. This is to be distinguished from actual settlement of the transaction. As used herein, "actual settlement" of the transaction includes at least converting real funds in an amount equal to the amount in the first currency into real funds in the second currency.

The parties are committed because of pre-existing bilateral contractual obligation between customer user 203 and the operator of server 100 and between merchant user 303 and the operator of server 100. The contractual obligations are preferably formed during the commencement of service relationship between server 100 and customer user 203 and merchant user 303 respectively.

The obligations can include the agreement of customer user 203 and merchant user 303 to permit server 100 to perform virtual settlement of the transaction. In return, server 100 can agree to incur the risks associated with currency exchange when it performs actual settlement of the transaction. In the preferred embodiment, customer user 203 and merchant user 303 agree to allow server 100 (on behalf of the operator of server 100) to maintain accounts and balances of funds managed by server 100. In addition, in the preferred embodiment, the movement of funds between those accounts is coincident with the transaction.

In this way, customer user 203 knows substantially the amount in the currency customer user 203 will pay for the product. Similarly, merchant user 303 knows substantially the price in the currency merchant user 303 will receive for the product. Customer user 203 and merchant user 303 do not bear the above-described risks associated with currency exchange. The amount customer user 203 knows and the price merchant user 303 knows is substantially the respective amount and price because there may be minor factors that affect these actual values. Such factors will be discussed in terms of risk factors. The entity charged with performing actual settlement of the transaction bears such risks when the transaction is actually settled.

The present invention is directed to approval of multi-currency transactions in which customer user 203 pays in one currency and merchant user 303 accepts the payment in another currency. To transact business, customer user 203 shops over network 50 among merchant users 303 who also have been permitted by server 100 to transact business (which may be, for example, those who have merchant sessions). Using well known techniques, customer user 203 and a merchant user 303 agree on a product to be purchased at a particular price and in a particular currency.

Thus, merchant user 303 will accept a price and receive payment for the product sold to customer user 203. The price for the product is in a currency accepted by merchant user 303, referenced herein as the "product price in the second currency." Customer user 203 will pay an amount to merchant user 303 for a selected product. The amount will be paid in a currency selected by customer user 203, referenced herein as the "amount in the first currency." The currency (second) selected by merchant user 303 is different than the currency (first) selected by customer user 203. Hence, currency exchange is used to approve the transaction contemplated by the present invention.

In a first embodiment of the present invention, server 100 is used to approve the transaction between customer user 203 and merchant user 303. As stated previously, approval commits customer user 203 and merchant user 303 to the terms of the transaction and commits server 100 to perform virtual settlement of the transaction.

In this embodiment, customer user 203 and merchant user 303 have established and agreed upon a product to be purchased at a price merchant user 303 will accept. This product and price are referred to herein as the "agreed product" and the "agreed price," respectively.

Having agreed upon the product and the price, customer computer 200 transmits a first set of data to server 100. This first set of data includes the amount in a first currency that customer user 203 is willing to pay for the agreed product. The transmitted amount is in the customer selected currency which is in a first currency. Other information may be transmitted by customer computer 200 as needed by server 100, for example, a requested payment range (described later), information identifying customer user 203, the product to be purchased, account information, and the like.

Having agreed upon the product and the price, merchant computer 300 transmits a second set of data to server 100. This second set of data includes the agreed price in a second currency that merchant user 303 is willing to receive for his product. The transmitted agreed price is in the merchant accepted currency which is in a second currency. Other information may be transmitted by the merchant computer 300 as needed by server 100, for example, information identifying merchant user 303, the product to be purchased, account information, and the like. As previously stated, the customer selected currency (first currency) is different than the merchant accepted currency (second currency).

In a further aspect of the preferred embodiment, along with providing the amount in the first currency, customer computer 200 also transmits the agreed price in the second currency to server 100. This assures that customer user 203 and merchant user 303 have actually reached agreement on the terms of the transaction and precludes either party from denying such agreement.

The system does not require that merchant user 303 know or approve the customer selected currency, that is, the currency in which customer user 203 will pay. There is no requirement that customer user 203 approve the merchant accepted currency, that is, the currency which merchant user 303 will receive. What is required is that server 100 be able to convert one such currency into the other.

However, it is noted that by not requiring "approval" of a currency by merchant user 303 and/or customer user 203 is distinguishable from the approval of a "transaction" by server 100. Approval of a currency would be, for example, where customer user 203 would need the permission of merchant user 303 to pay in a given customer selected currency. Approval of transaction, on the other hand, commits customer user 203 and merchant user 303 to the terms of the transaction and commits server 100 to perform virtual settlement of the transaction. The present invention does not require approval of a currency.

The first and second sets of data transmitted to server 100 need not come directly from customer computer 200 and merchant computer 300. This information may be transmitted via alternative routes. For example, in the preferred embodiment, customer computer 200 transmits the first set of data to the merchant computer 300. Upon receipt of the first set of data, merchant computer 300 transmits at least the amount in the first currency and the second set of data including the product price in the second currency to server 100 for approval of the transaction. In this case, the first set of data may be protected to prevent the merchant from altering it.

Upon receiving the amount in the first currency and the product price in the second currency, server 100 can approve the transaction. The approval process performed by server 100 is based upon the relative value of the amount in the first currency in terms of the product price in the second currency. This relative value may be established by the operator of server 100, a third party, or in other aspects of the present invention, customer user 203 or merchant user 303. This preferably includes a rate of exchange at which the amount in the first currency can be converted into a converted amount in the second currency. Alternatively, or in addition, this information may include a rate at which the merchant accepted currency can be converted into the customer selected currency.

Approval of the transaction occurs when the amount in the first currency is sufficient to pay merchant user 303 the product price in the second currency. The sufficiency determination process preferably includes converting the amount in the first currency into a converted amount in the second currency, referenced herein as the "converted amount in the second currency," using a current exchange rate.

In the preferred embodiment, the current exchange rate data is maintained by the entity charged with approving the transaction. Thus, in this embodiment, server 100 may obtain the exchange rate from a currency broker or bank. In a further aspect of this embodiment, the approving entity may decide to buy and sell currencies and establish the approving entity's own exchange rates. In addition, as server 100 has the opportunity to aggregate transactions prior to committing to actually exchange currency with an external agency, the approving entity may obtain preferential exchange rates by converting money in relatively large units.

The frequency that the current exchange rate data is updated depends upon the level of risk that the approving entity may be willing to accept and the availability of updates from currency brokerage services. In the preferred embodiment, when server 100 is the approving entity, server 100 receives updates to the exchange rate data on-line from one or more currency brokers. Frequency and timing of updates are based on business rules agreed between the operator of server 100 and the currency broker or brokers. This manages the risk of a significant change between the current exchange rate and the exchange rate used when the transaction is actually settled.

Approval of the transaction by server 100 is preferably based upon predetermined criteria. These criteria may be established by any of the parties to the transaction or a third party. For example, in the preferred embodiment server 100 approves the transaction if the converted amount in the second currency equals or exceeds the product price in the second currency.

Alternatively, server 100 could approve the transaction if the converted amount in the second currency is less than the product price in the second currency. In this instance, server 100 may absorb differentials (as where the cost associated with disapproving the transaction and reprocessing it exceeds the differential). Acceptable differentials may be dependent upon the credit worthiness of customer user 203 or merchant user 303, the acceptable deficit balance that customer user 203 or merchant user 303 are allowed to incur, or other market conditions such as, for example, fluctuations in exchange rates. These acceptable differentials are referred to with respect to each party of the transaction as a "risk range."

Also, in the case where the converted amount in the second currency is less than the product price in the second currency, but within a predetermined range, server 100 could record the differentials as they occur and collect them from customer user 203 at a later time. This range is contemplated as being a small range and is referred to herein as the "payment range." The payment range may be predetermined by customer user 203 or preferably, by server 100. For the purpose of this application, the amount in the first currency is equal to the amount in the first currency plus or minus the payment range. The payment range thus defines the amount of conversion error permitted in the transaction.

Approval of the transaction may also be contingent upon customer user 203 having access to electronic funds in an amount equal to or exceeding the amount in the customer selected currency (ACSC). These funds maybe stored or represented in a customer account associated with customer user 203. In this case, server 100 approves the transaction when the converted amount in the second currency meets the predetermined criteria described above and the customer account contains electronic funds in an amount at least equal to the amount in the first currency. Using any of the above methods for approval, alone or in combination, server 100 approves the transaction.

In order to avoid having to access the customer account of customer user 203 and for security reasons, it is preferred to limit the amount in the first set of data that a customer user 203 can transmit to server 100 by the session amount. The session amount is an amount known by server 100 to which the customer has access when customer user 203 is permitted to shop. The limited amount is reduced as customer user 203 purchases products over network 50. Customer computer 200 temporarily prohibits customer user 203 from transmitting an amount exceeding the session amount to server 100 to be considered for sufficiency until more electronic funds are added to the session in which case the session amount has been increased.

In the preferred embodiment, under such circumstances, the existing session will automatically close and a new session will be opened with funds at least sufficient to complete the transaction. Once the subsequent session is opened, the transaction may be approved. Of course, if server 100 determines that customer user 203 does not have enough funds available to it to open a subsequent session of sufficient value, the transaction may be refused by server 100 altogether or server 100 may approve the transaction as described herein.

In the preferred embodiment, the funds that are available to customer user 203 during the session and the funds received by merchant user 303 during the session be maintained to two decimal positions to the right of the minor unit of a currency. For example, in the case of U.S. dollars, the present invention preferably would carry the value of session funds to one hundredth of a penny to assure that rounding errors are minimized during a session, thus decreasing rounding errors during currency conversion of small transactions. When a session closes, the balance in the session is adjusted to whole minor currency units (this adjustment may be rounding or truncation).

Once the transaction is approved, customer user 203 and merchant user 303 are committed to the terms of the transaction. Specifically, customer user 203 is committed to pay the amount in the first currency. Similarly, merchant user 303 is committed to accept the product price in the second currency for the product. The parties are committed as such through the contractual arrangement previously described.

By the contractual obligations described above, server 100 is committed to perform virtual settlement of the transaction. Therefore, according to this aspect of the present invention, a customer account may be maintained for customer user 203 and a merchant account may be maintained for merchant user 303. The customer accounts and merchant accounts are preferably maintained by server 100. However, one or both of the accounts may be maintained by a party other than server 100.

The customer account and merchant account maybe debit or credit accounts. In the preferred embodiment, the customer account is a debit account and the merchant account is a credit account and each such account represent funds in the form of electronic funds. However, other types of accounts may be used as known by those skilled in the art.

In the case where a party other than server 100 maintains a merchant account and/or a customer account, server 100 may transmit data to the party to enable virtual settlement. For example, if the other party maintains the customer account and the merchant account, server 100 may transmit data identifying the customer account and the amount in the first currency to be debited, and the merchant account and the product price in the second currency to be credited. Then, the party would debit the customer account and credit the merchant account accordingly.

In this process, upon approval of the transaction, the customer account is debited by the amount in the first currency. The merchant account is credited with the agreed price in the second currency. This amount and price were known by and agreed to by customer user 203 and merchant user 303. Thus, there is no uncertainty as to the amount or currency to be paid by customer user 203 or the price or currency to be received by merchant user 303.

Several variations on the above described embodiment provides that the currency used in the first currency may be selected by customer user 203 (or server 100) from a plurality of currencies, referred to herein as "customer currencies." Also, the currency used in the merchant accepted currency may be selected by customer user 203 from a plurality of currencies, referred to herein as "merchant currencies." A description of these variations is now provided.

A customer user 203 may have access to amounts in a plurality of customer currencies. For example, a customer user 203 may have accounts containing amounts in U.S. dollars, French francs, and Japanese yen. Customer user 203 can purchase products using amounts from any of these accounts. To effect this option, customer computer 200 presents an amount in each of the plurality of customer currencies to customer user 203. This is done using exchange rate data for each customer currency to convert the merchant accepted currency into amounts in each of the customer currencies. In the preferred embodiment, the exchange rate data is provided to customer computer 200 by server 100 at various times. Other mechanisms for obtaining such data include the use of brokers. Customer user 203 selects an amount in one of the plurality of customer currencies in which the customer user 203 will spend for the product. This selected amount represents the amount in the first currency described previously and is referred herein as the "selected currency."

In the above description, the method by which customer computer 200 determines the amount of customer currency to pay for a purchase in the merchant computer 300's currency is omitted. While there are a number of ways to enable this conversion, in the preferred embodiment, prior to the inception of the customer computer 200's session, customer computer 200 requests exchange rate data. This data will contain at least conversion rates from the session currency to other convertible currencies, it may also contain additional data such as anticipated expiration of the exchange rates. These rates are used by customer computer 200 to estimate the amount of customer currency to pay for a purchase in merchant currency. As conversion rates may change rapidly, in the preferred embodiment, this data is advisory only. Server 100 can send updated data to customer computer 200 during any communication between them. The implication of this decision is that if customer computer 200 pays insufficient funds to convert, it is viewed as a natural error due to obsolete data, not an attempt to defraud.

This aspect of the present invention can further include an optimization feature. The optimization feature is preferably executed by customer computer 200 to determine whether it is advantageous for customer user 203 to pay in one customer currency over another.

More specifically, customer computer 200 determines the agreed price in the merchant accepted currency corresponding to the amount in each of the plurality of customer currencies. For example, assume merchant user 303 will receive a price in currency C for the product and customer user 203 has two customer currencies A and B available to pay merchant user 303. Customer computer 200 determines amounts in currencies A and B which equate to the product price in currency C. These amounts may be compared by converting them to a reference currency of the customer computer 200's choice. Customer user 203 can choose (or customer computer 200 can be programmed to choose) to pay the agreed price in the currency (A or B) which corresponds to the lesser amount in the reference currency. The amount in the chosen currency represents the amount in the first currency and is referred herein as the "selected currency."

According to another variation to this optimization feature, customer computer 200 can also determine whether it is less expensive to first convert currency A into currency B, and then to convert currency B into currency C. In any case, customer user 203 pays using the optimal payment currency. This preferred mode reduces complexity of currency exchange to customer user 203 without reducing the options available to customer user 203.

In another embodiment, server 100 can execute an optimization feature. In this case, server 100 may include the plurality of customer currencies available to customer user 203. For example, data indicating the plurality of customer currencies may be transmitted in the first set of data from customer computer 200 to server 100 in lieu of the amount in the first currency. In a manner similar to that described above, server 100 determines the agreed amount in the second currency for each of the plurality of customer currencies. Server 100 then chooses an amount in one of the customer currencies corresponding to the amount in the merchant accepted currency which is the least when converted to the reference currency. The amount in the chosen currency represents the amount in the first currency.

In another embodiment of the present invention, it is expected that a merchant user 303 may desire to transact business in more than one currency. Therefore, merchant user 303 will accept a price for the product in one of a plurality of merchant currencies. Merchant computer 300 communicates the agreed price for the product in each of the merchant currencies to customer computer 200. Customer computer 200 presents the agreed price in each of the merchant currencies to customer user 203. Customer user 203 selects the agreed price in one of the merchant currencies that merchant user303 will accept. This selected currency maybe recommended by the optimization procedure described above. This selected price represents the product price in the merchant accepted currency (PMAC), although it is actually selected by customer user 203.

According to a variation to this optimization feature, customer computer 200 may also determine which customer currency - merchant currency pair represents the best value to customer user 203. This is accomplished by customer computer 200 using exchange rate data to convert the price of the product in each merchant accepted currency into each of the customer currencies and selecting the lowest value among the results. For example, if customer user 203 has access to currencies A, B, C and merchant user 203 is willing to accept currencies y and z, customer computer 200 will determine the cost of the products as quoted in merchant accepted currencies y and z in terms of customer accepted currency A. Whichever of these conversions yields the lowest cost to customer user 203 is the optimal customer currency merchant currency pair for customer currency A. This process is repeated until an optimal currency pair is computed for each customer currency. For example, this process may yield the following results: A to y, B to y, and C to z.

The next step is to decide which of these currency pairs represents the best value to customer user 203. In the preferred embodiment, this is accomplished by converting each customer currency to a single reference currency. The conversion that yields the smaller number is identified as the "best" choice and is displayed to customer user 203. Clearly, other approaches to determining the optimum currency can be devised by those skilled in the art.

Figure 2:
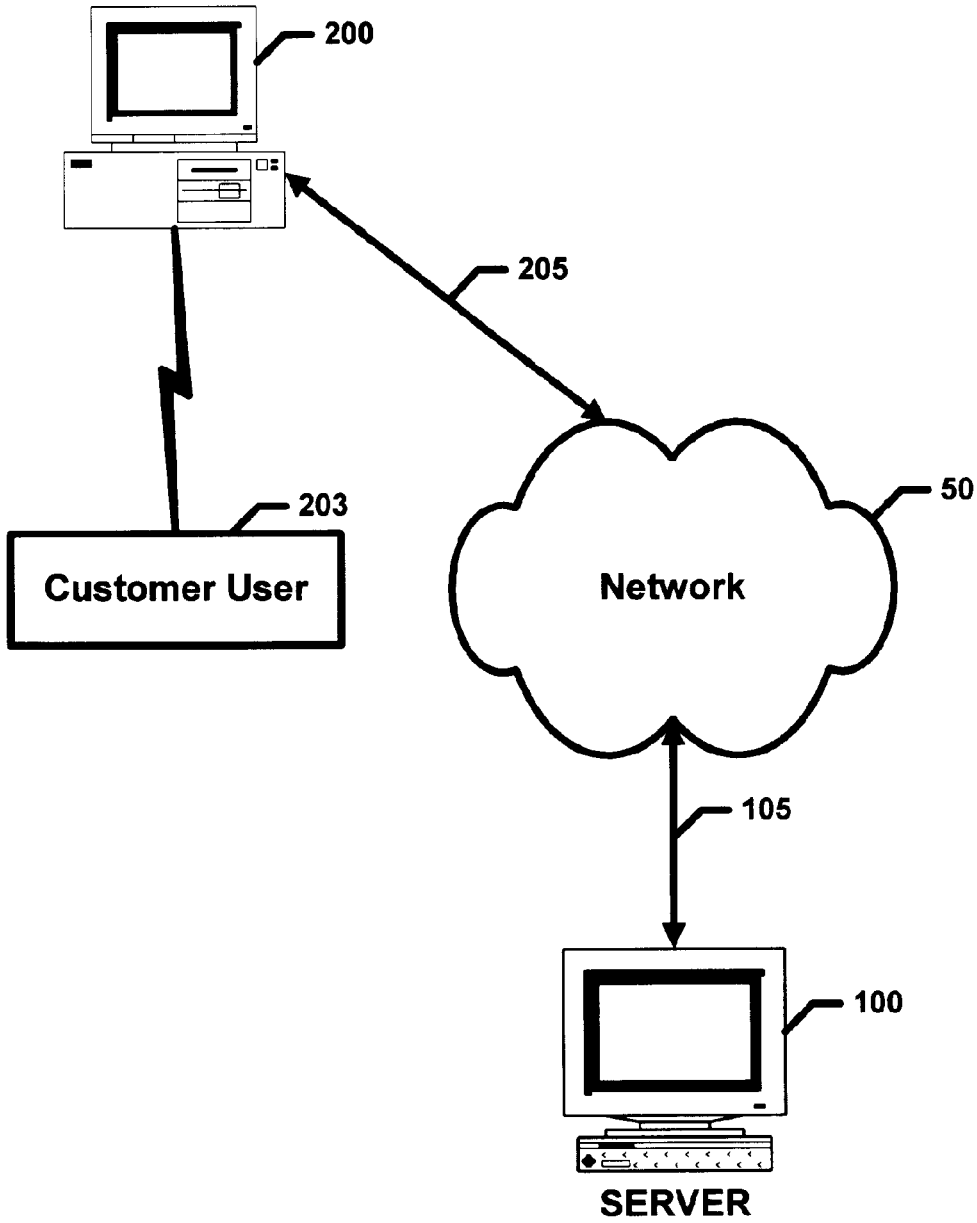
FIG. 2 is a diagrammatic representation of another aspect of the present invention.

Another embodiment of the present invention, as shown in FIG. 2, again uses server 100 to approve the transaction between customer user 203 and merchant user 303. However, the merchant computer need not be connected to network 50 according to this aspect of the invention.

More particularly, in this embodiment, customer user 203 has knowledge about the product that merchant user 303 is providing and the price in the merchant selected currency for the product before submitting the first set of data to server 100. This knowledge need not be gained while customer user 203 shops over network 50. For example, merchant user 303 can have distributed catalogs to customer user 203 (via regular mail, email, etc.) illustrating products, prices, and currencies therefor. Server 100 would receive the same information, that is, data representing the same products, prices and currencies from merchant user 303. This data may be received by server 100 electronically over network 50 or by some other means. For example, merchant user 303 might provide the data representing the products, prices and currencies therefor via a network to which customer computer 200 is not connected or by mail on a diskette. However received, this data would be accessible by server 100.

After viewing the catalog, customer user 203 may purchase a product over network 50. In this case, customer computer 200 transmits to server 100 a description of a desired product (e.g., model number) and an amount in the first currency for the desired product.

Server 100 thus has access to data indicating the amount in the first currency which customer user 203 is willing to pay for a product and the product price in the second currency which merchant user 303 is willing to accept for the product. With this data, server 100 approves the transaction as indicated above.

In any of the foregoing embodiments, notice of approval of the transaction may be provided by server 100 to customer user 203 and merchant user 303 For example, server 100 may transmit data indicating approval to the merchant computer 300. After merchant computer 300 receives the data indicating approval, merchant computer 300 may transmit at least a portion of the data indicating approval to customer computer 200. In a similar manner, data indicating approval may be communicated from server 100 to customer computer 200, which, in turn, would forward this data to merchant computer 300. In this manner, customer user 203 and merchant user 303 may be informed that the transaction was approved.

Alternatively, server 100 may separately transmit data indicating approval to customer computer 200 and merchant computer 300. In yet another embodiment, the absence of notice from server 100 maybe deemed as affirmative notice that the transaction was approved. According to any of these procedures, or other preestablished procedures, notice may be provided to the participants in the transaction. Further, once notice of approval is provided, the product which is the subject of the transaction may be provided to customer user 203 and the payment of the funds corresponding to the agreed price will be received by merchant user 303 in the merchant accepted currency.

Actual settlement may occur contemporaneously with the approval of the transaction or it may be deferred. As is described below, it is the entity charged with performing the actual settlement who bears the risk.

In the preferred embodiment, server 100 performs actual settlement of the transaction. Therefore, according to this aspect of the present invention, server 100 also has its own server accounts. Server accounts are in currencies corresponding to the currencies of the customer and merchant accounts. Server accounts represent real cash, credit, and the like, corresponding to the electronic funds stored in the customer and merchant accounts.

To perform actual settlement, server 100 may transmit data to a currency broker, bank or financial institution to enable actual settlement. For example, server 100 may transmit data identifying server account and the amount in the first currency so that the entity can convert real funds in an amount equal to the amount in the customer selected currency into real funds in the second currency.

In the preferred embodiment, server 100 aggregates the amounts in each currency before settling. This may decrease the number of actual conversions that must be made from possibly hundreds per second to a few times per hour (or day). The frequency may vary depending on the volatility of the currency exchange market and on the relative currency balances in server 100's various currency accounts.

Note that server 100 is bound even if the later currency exchange rates are or become unfavorable to server 100 as compared to the current exchange rates used during the virtual settlement. By eliminating the risk to customer user 203 and merchant user 303, such risk is passed to server 100.

In the preferred embodiment, measures are taken to manage the risk associated with the currency exchange to server 100. For example, server 100 can have a preestablished agreement with the bank or financial institution. The terms of such an agreement might include a commitment on the part of server 100 to settle transactions within a predetermined amount, time, and/or within a predetermined currency rate deviation. The predetermined amount of time may be on the order of several seconds or minutes.

In the preferred embodiment, during this predetermined amount of time, server 100 aggregates transactions and submits them in batch for exchange. In return for server 100's commitment, the entity may offer server 100 a favorable currency exchange rate.

It is seen from the above detailed description that customer and merchant obligations relating to multi-currency transactions can be fixed at the time of the transaction. In this manner, risks to these parties heretofore associated with currency exchange is minimized. To this end, the parties to a multi-currency transaction authorize an approving entity to settle the transaction. Authorization is granted by virtue of customer user 203 and merchant user 303 setting up their respective accounts, knowing that transactions will be submitted and processed. The parties transmit data representing the transaction to the approving authority. This data includes an amount in a first currency that a customer user 203 is willing to pay for a product and a product price in a different second currency which a merchant user 303 is willing to accept for the product. Using predetermined criteria, the approving entity approves the transaction. Once the transaction is approved, the approving entity may actually settle the transaction at its discretion thereby bearing the risk associated with currency exchange. The parties, however, incur no risk. Customer user 203 will pay the amount in the first currency and merchant user 303 will receive the product price in the second currency. These are values known and agreed to by the parties at the time of the transaction.

An alternate method of managing risk for extremely volatile currencies, server 100 may choose to withdraw a currency or currencies from the list of convertible currencies.

Although the particular embodiments shown and described above will prove to be useful in many applications relating to the arts to which the present invention pertains, further modifications of the present invention herein disclosed will occur to persons skilled in the art. All such modifications are deemed to be within the scope of the present invention as defined by the appended claims.

What is claimed is:

[1. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is at least equal to the product price in the second currency in accordance with current exchange rates.]

[2. The system of claim 1, wherein the customer selects the first currency from the plurality of currencies in which the customer has an account for each currency.]

[3. The system of claim 1, wherein the server selects the first currency from the plurality of currencies in which the customer has an account for each currency, wherein the selected first currency when converted into the second currency, the merchant price is the least expensive.]

[4. The system of claim 1, wherein the customer selects the second currency from the plurality of currencies the merchant is willing to accept.]

[5. The system of claim 1, wherein the server selects the second currency from the plurality of currencies, wherein the merchant price is the least expensive for the selected second currency when the first currency is converted into the second currency.]

[6. The system of claim 1, wherein the first currency is selected from a plurality of currencies in which the customer has an account for each currency and the second currency is selected from a plurality of currencies the merchant is willing to accept.]

[7. The system of claim 6, wherein the customer selects the first currency from the plurality of currencies.]

[8. The system of claim 6, wherein the server selects the first currency from the plurality of currencies, wherein the selected first currency when converted into the second currency, the merchant price is the least expensive.]

[9. The system of claim 6, wherein the customer selects the second currency from the plurality of currencies the merchant is willing to accept.]

[10. The system of claim 6, wherein the server selects the second currency from the plurality of currencies, wherein the merchant price is the least expensive for the selected second currency when the first currency is converted into the second currency.]

[11. The system of claim 1, wherein the server further comprises a customer balance account associated with the customer, wherein the customer balance account comprises a customer balance in the first currency and wherein the server deducts the amount in the first currency from the balance in the customer balance account.]

[12. The system of claim 1, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[13. The system of claim 1, wherein the server further comprises a merchant balance account associated with the merchant, wherein the merchant balance account comprises a merchant balance in the second currency and wherein the server adds the converted amount in the second currency to the balance in the merchant balance account.]

[14. The system of claim 1, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[15. The system of claim 1, wherein the network is selected from the group consisting of the Internet, an intranet, and a Local Area Network (LAN).]

[16. The system of claim 1, wherein the current exchange rate is selected from the group consisting of a currency broker and a bank.]

[17. The system of claim 1, wherein the merchant sets the exchange rate.]

[18. The system of claim 1, wherein the customer computer sends a copy of the agreed price in the second currency to the server.]

[19. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the customer selects the first currency from the plurality of currencies in which the customer has an account for each currency.]

[20. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the server selects the first currency from the plurality of currencies in which the customer has an account for each currency, wherein the selected first currency when converted into the second currency, the merchant price is the least expensive.]

[21. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the customer selects the second currency from the plurality of currencies the merchant is willing to accept.]

[22. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the server selects the second currency from the plurality of currencies, wherein the merchant price is the least expensive for the selected second currency when the first currency is converted into the second currency.]

[23. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the first currency is selected from a plurality of currencies in which the customer has an account for each currency and the second currency is selected from a plurality of currencies the merchant is willing to accept.]

[24. The system of claim 23, wherein the customer selects the first currency from the plurality of currencies.]

[25. The system of claim 23, wherein the server selects the first currency from the plurality of currencies, wherein the selected first currency when converted into the second currency, the merchant price is the least expensive.]

[26. The system of claim 23, wherein the customer selects the second currency from the plurality of currencies the merchant is willing to accept.]

[27. The system of claim 23, wherein the server selects the second currency from the plurality of currencies, wherein the merchant price is the least expensive for the selected second currency when the first currency is converted into the second currency.]

[28. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[29. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[30. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the current exchange rate is selected from the group consisting of a currency broker and a bank.]

[31. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the merchant sets the exchange rate.]

[32. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a risk range of the product price in the second currency in accordance with current exchange rates, wherein the customer computer sends a copy of the agreed price in the second currency to the server.]

[33. A system for determining approval of a transaction between a merchant and a customer over a network, wherein the system comprises:

a network;

a customer computer associated with a customer and connected to the network, wherein the customer computer further comprises a first set of data including an amount the customer agrees to pay for the a product in a first currency;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for converting the amount in the first currency into a converted amount in the second currency, and for approving the transaction when the converted amount in the second currency is within a payment range of the product price in the second currency in accordance with current exchange rates.]

[34. The system of claim 33, wherein the customer selects the first currency from the plurality of currencies in which the customer has an account for each currency.]

[35. The system of claim 33, wherein the server selects the first currency from the plurality of currencies in which the customer has an account for each currency, wherein the selected first currency when converted into the second currency, the merchant price is the least expensive.]

[36. The system of claim 33, wherein the customer selects the second currency from the plurality of currencies the merchant is willing to accept.]

[37. The system of claim 33, wherein the server selects the second currency from the plurality of currencies, wherein the merchant price is the least expensive for the selected second currency when the first currency is converted into the second currency.]

[38. The system of claim 33, wherein the first currency is selected from a plurality of currencies in which the customer has an account for each currency and the second currency is selected from a plurality of currencies the merchant is willing to accept.]

[39. The system of claim 38, wherein the customer selects the first currency from the plurality of currencies.]

[40. The system of claim 38, wherein the server selects the first currency from the plurality of currencies, wherein the selected first currency when converted into the second currency, the merchant price is the least expensive.]

[41. The system of claim 38, wherein the customer selects the second currency from the plurality of currencies the merchant is willing to accept.]

[42. The system of claim 38, wherein the server selects the second currency from the plurality of currencies, wherein the merchant price is the least expensive for the selected second currency when the first currency is converted into the second currency.]

[43. The system of claim 33, wherein the server further comprises a customer balance account associated with the customer, wherein the customer balance account comprises a customer balance in the first currency and wherein the server deducts the amount in the first currency from the balance in the customer balance account.]

[44. The system of claim 33, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[45. The system of claim 33, wherein the server further comprises a merchant balance account associated with the merchant, wherein the merchant balance account comprises a merchant balance in the second currency and wherein the server adds the converted amount in the second currency to the balance in the merchant balance account.]

[46. The system of claim 33, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[47. The system of claim 33, wherein the network is selected from the group consisting of the Internet, an intranet, and a Local Area Network (LAN).]

[48. The system of claim 33, wherein the current exchange rate is selected from the group consisting of a currency broker and a bank.]

[49. The system of claim 33, wherein the merchant sets the exchange rate.]

[50. The system of claim 33, wherein the customer computer sends a copy of the agreed price in the second currency to the server.]

[51. The system of claim 33, wherein if the converted amount in the second currency is less than the product price in the second currency and the difference between the converted amount in the second currency and the product price in the second currency is within a predetermined range, then the server records the difference.]

[52. The system of claim 51, wherein the server collects the recorded difference from the customer.]

[53. A system for determining approval of a transaction between a merchant and a customer over a network, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept;

a merchant computer associated with a merchant and connected to the network, wherein the merchant computer further comprises a second set of data including a product price at which the merchant agrees to sell the product in the second currency; and a server connected to both the customer computer via the network and the merchant computer via the network, for receiving the first set of data, the second set of data, and for approving the transaction when the converted amount in the second currency is at least equal to the product price in the second currency in accordance with current exchange rates.]

[54. The system of claim 53, wherein the customer selects the first currency from the plurality of currencies in which the customer has an account for each currency.]

[55. The system of claim 53, wherein the server selects the first currency from the plurality of currencies in which the customer has an account for each currency, wherein the selected first currency when converted into the second currency, the merchant price is the least expensive.]

[56. The system of claim 53, wherein the customer selects the second currency from the plurality of currencies the merchant is willing to accept.]

[57. The system of claim 53, wherein the server selects the second currency from the plurality of currencies, wherein the merchant price is the least expensive for the selected second currency when the first currency is converted into the second currency.]

[58. The system of claim 53, wherein the first currency is selected from a plurality of currencies in which the customer has an account for each currency and the second currency is selected from a plurality of currencies the merchant is willing to accept.]

[59. The system of claim 58, wherein the customer selects the first currency from the plurality of currencies.]

[60. The system of claim 58, wherein the server selects the first currency from the plurality of currencies, wherein the selected first currency when converted into the second currency, the merchant price is the least expensive.]

[61. The system of claim 58, wherein the customer selects the second currency from the plurality of currencies the merchant is willing to accept.]

[62. The system of claim 58, wherein the server selects the second currency from the plurality of currencies, wherein the merchant price is the least expensive for the selected second currency when the first currency is converted into the second currency.]

[63. The system of claim 53, wherein the server further comprises a customer balance account associated with the customer, wherein the customer balance account comprises a customer balance in the first currency and wherein the server deducts the amount in the first currency from the balance in the customer balance account.]

[64. The system of claim 53, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[65. The system of claim 53, wherein the server further comprises a merchant balance account associated with the merchant, wherein the merchant balance account comprises a merchant balance in the second currency and wherein the server adds the converted amount in the second currency to the balance in the merchant balance account.]

[66. The system of claim 53, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[67. The system of claim 53, wherein the network is selected from the group consisting of the Internet, an intranet, and a Local Area Network (LAN).]

[68. The system of claim 53, wherein the current exchange rate is selected from the group consisting of a currency broker and a bank.]

[69. The system of claim 53, wherein the merchant sets the exchange rate.]

[70. The system of claim 53, wherein the customer computer sends a copy of the agreed price in the second currency to the server.]

[71. A system for determining approval of a transaction between a merchant and a customer over a network, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for approving the transaction when the converted amount in the second currency is within a risk range of the product price in the second currency in accordance with current exchange rates.]

[72. The system of claim 71, wherein the customer selects the first currency from the plurality of currencies in which the customer has an account for each currency.]

[73. The system of claim 71, wherein the server selects the first currency from the plurality of currencies in which the customer has an account for each currency, wherein the selected first currency when converted into the second currency, the merchant price is the least expensive.]

[74. The system of claim 71, wherein the customer selects the second currency from the plurality of currencies the merchant is willing to accept.]

[75. The system of claim 71, wherein the server selects the second currency from the plurality of currencies, wherein the merchant price is the least expensive for the selected second currency when the first currency is converted into the second currency.]

[76. The system of claim 71, wherein the first currency is selected from a plurality of currencies in which the customer has an account for each currency and the second currency is selected from a plurality of currencies the merchant is willing to accept.]

[77. The system of claim 76, wherein the customer selects the first currency from the plurality of currencies.]

[78. The system of claim 76, wherein the server selects the first currency from the plurality of currencies, wherein the selected first currency when converted into the second currency, the merchant price is the least expensive.]

[79. The system of claim 76, wherein the customer selects the second currency from the plurality of currencies the merchant is willing to accept.]

[80. The system of claim 76, wherein the server selects the second currency from the plurality of currencies, wherein the merchant price is the least expensive for the selected second currency when the first currency is converted into the second currency.]

[81. The system of claim 71, wherein the server further comprises a customer balance account associated with the customer, wherein the customer balance account comprises a customer balance in the first currency and wherein the server deducts the amount in the first currency from the balance in the customer balance account.]

[82. The system of claim 71, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[83. The system of claim 71, wherein the server further comprises a merchant balance account associated with the merchant, wherein the merchant balance account comprises a merchant balance in the second currency and wherein the server adds the converted amount in the second currency to the balance in the merchant balance account.]

[84. The system of claim 71, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[85. The system of claim 71, wherein the network is selected from the group consisting of the Internet, an intranet, and a Local Area Network (LAN).]

[86. The system of claim 71, wherein the current exchange rate is selected from the group consisting of a currency broker and a bank.]

[87. The system of claim 71, wherein the merchant sets the exchange rate.]

[88. The system of claim 71, wherein the customer computer sends a copy of the agreed price in the second currency to the server.]

[89. A system for determining approval of a transaction between a merchant and a customer over a network, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept;

a merchant computer associated with a merchant and connected to the network, wherein the merchant computer further comprises a second set of data including a product price at which the merchant agrees to sell the product in a second currency; and a server connected to both the customer computer via the network and the merchant computer via the network, for receiving the first set of data, the second set of data, and for approving the transaction when the converted amount in the second currency is within a payment range of the product price in the second currency in accordance with current exchange rates.]

[90. The system of claim 89, wherein the customer selects the first currency from the plurality of currencies in which the customer has an account for each currency.]

[91. The system of claim 89, wherein the server selects the first currency from the plurality of currencies in which the customer has an account for each currency, wherein the selected first currency when converted into the second currency, the merchant price is the least expensive.]

[92. The system of claim 89, wherein the customer selects the second currency from the plurality of currencies the merchant is willing to accept.]

[93. The system of claim 89, wherein the server selects the second currency from the plurality of currencies, wherein the merchant price is the least expensive for the selected second currency when the first currency is converted into the second currency.]

[94. The system of claim 89, wherein the first currency is selected from a plurality of currencies in which the customer has an account for each currency and the second currency is selected from a plurality of currencies the merchant is willing to accept.]

[95. The system of claim 94, wherein the customer selects the first currency from the plurality of currencies.]

[96. The system of claim 94, wherein the server selects the first currency from the plurality of currencies, wherein the selected first currency when converted into the second currency, the merchant price is the least expensive.]

[97. The system of claim 94, wherein the customer selects the second currency from the plurality of currencies the merchant is willing to accept.]

[98. The system of claim 94, wherein the server selects the second currency from the plurality of currencies, wherein the merchant price is the least expensive for the selected second currency when the first currency is converted into the second currency.]

[99. The system of claim 89, wherein the server further comprises a customer balance account associated with the customer, wherein the customer balance account comprises a customer balance in the first currency and wherein the server deducts the amount in the first currency from the balance in the customer balance account.]

[100. The system of claim 89, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[101. The system of claim 89, wherein the server further comprises a merchant balance account associated with the merchant, wherein the merchant balance account comprises a merchant balance in the second currency and wherein the server adds the converted amount in the second currency to the balance in the merchant balance account.]

[102. The system of claim 89, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[103. The system of claim 89, wherein the network is selected from the group consisting of the Internet, an intranet, and a Local Area Network (LAN).]

[104. The system of claim 89, wherein the current exchange rate is selected from the group consisting of a currency broker and a bank.]

[105. The system of claim 89, wherein the merchant sets the exchange rate.]

[106. The system of claim 89, wherein the customer computer sends a copy of the agreed price in the second currency to the server.]

[107. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including an amount the customer agrees to pay for the a product in a first currency; and a server connected to the customer computer via the network and having the product price in a second currency, for receiving the first set of data, for converting the amount in the first currency into a converted amount in the second currency, and for approving the transaction when the converted amount in the second currency is at least equal to the product price in the second currency in accordance with current exchange rates.]

[108. The system of claim 107, wherein the customer selects the first currency from the plurality of currencies in which the customer has an account for each currency.]

[109. The system of claim 107, wherein the server selects the first currency from the plurality of currencies in which the customer has an account for each currency, wherein the selected first currency when converted into the second currency, the merchant price is the least expensive.]

[110. The system of claim 107, wherein the customer selects the second currency from the plurality of currencies the merchant is willing to accept.]

[111. The system of claim 107, wherein the server selects the second currency from the plurality of currencies, wherein the merchant price is the least expensive for the selected second currency when the first currency is converted into the second currency.]

[112. The system of claim 107, wherein the first currency is selected from a plurality of currencies in which the customer has an account for each currency and the second currency is selected from a plurality of currencies the merchant is willing to accept.]

[113. The system of claim 112, wherein the customer selects the first currency from the plurality of currencies.]

[114. The system of claim 112, wherein the server selects the first currency from the plurality of currencies, wherein the selected first currency when converted into the second currency, the merchant price is the least expensive.]

[115. The system of claim 112, wherein the customer selects the second currency from the plurality of currencies the merchant is willing to accept.]

[116. The system of claim 112, wherein the server selects the second currency from the plurality of currencies, wherein the merchant price is the least expensive for the selected second currency when the first currency is converted into the second currency.]

[117. The system of claim 107, wherein the server further comprises a customer balance account associated with the customer, wherein the customer balance account comprises a customer balance in the first currency and wherein the server deducts the amount in the first currency from the balance in the customer balance account.]

[118. The system of claim 107, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[119. The system of claim 107, wherein the server further comprises a merchant balance account associated with the merchant, wherein the merchant balance account comprises a merchant balance ha the second currency and wherein the server adds the converted amount in the second currency to the balance in the merchant balance account.]

[120. The system of claim 107, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[121. The system of claim 107, wherein the network is selected from the group consisting of the Internet, an intranet, and a Local Area Network (LAN).]

[122. The system of claim 107, wherein the current exchange rate is selected from the group consisting of a currency broker and a bank.]

[123. The system of claim 107, wherein the merchant sets the exchange rate.]

[124. The system of claim 107, wherein the customer computer sends a copy of the agreed price in the second currency to the server.]

[125. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including an amount the customer agrees to pay for the a product in a first currency; and a server connected to the customer computer via the network and having the product price in a second currency, for receiving the first set of data, for converting the amount in the first currency into a converted amount in the second currency, and for approving the transaction when the converted amount in the second currency is within a risk range of the product price in the second currency in accordance with current exchange rates.]

[126. The system of claim 125, wherein the customer selects the first currency from the plurality of currencies in which the customer has an account for each currency.]

[127. The system of claim 125, wherein the server selects the first currency from the plurality of currencies in which the customer has an account for each currency, wherein the selected first currency when converted into the second currency, the merchant price is the least expensive.]

[128. The system of claim 125, wherein the customer selects the second currency from the plurality of currencies the merchant is willing to accept.]

[129. The system of claim 125, wherein the server selects the second currency from the plurality of currencies, wherein the merchant price is the least expensive for the selected second currency when the first currency is converted into the second currency.]

[130. The system of claim 125, wherein the first currency is selected from a plurality of currencies in which the customer has an account for each currency and the second currency is selected from a plurality of currencies the merchant is willing to accept.]

[131. The system of claim 130, wherein the customer selects the first currency from the plurality of currencies.]

[132. The system of claim 130, wherein the server selects the first currency from the plurality of currencies, wherein the selected first currency when converted into the second currency, the merchant price is the least expensive.]

[133. The system of claim 130, wherein the customer selects the second currency from the plurality of currencies the merchant is willing to accept.]

[134. The system of claim 130, wherein the server selects the second currency from the plurality of currencies, wherein the merchant price is the least expensive for the selected second currency when the first currency is converted into the second currency.]

[135. The system of claim 125, wherein the server further comprises a customer balance account associated with the customer, wherein the customer balance account comprises a customer balance in the first currency and wherein the server deducts the amount in the first currency from the balance in the customer balance account.]

[136. The system of claim 125, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[137. The system of claim 125, wherein the server further comprises a merchant balance account associated with the merchant, wherein the merchant balance account comprises a merchant balance in the second currency and wherein the server adds the converted amount in the second currency to the balance in the merchant balance account.]

[138. The system of claim 125, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[139. The system of claim 125, wherein the network is selected from the group consisting of the Internet, an intranet, and a Local Area Network (LAN).]

[140. The system of claim 125, wherein the current exchange rate is selected from the group consisting of a currency broker and a bank.]

[141. The system of claim 125, wherein the merchant sets the exchange rate.]

[142. The system of claim 125, wherein the customer computer sends a copy of the agreed price in the second currency to the server.]

[143. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including an amount the customer agrees to pay for the a product in a first currency; and a server connected to the customer computer via the network and having the product price in a second currency, for receiving the first set of data, for converting the amount in the first currency into a converted amount in the second currency, and for approving the transaction when the converted amount in the second currency is within a payment range of the product price in the second currency in accordance with current exchange rates.]

[144. The system of claim 143, wherein the customer selects the first currency from the plurality of currencies in which the customer has an account for each currency.]

[145. The system of claim 143, wherein the server selects the first currency from the plurality of currencies in which the customer has an account for each currency, wherein the selected first currency when converted into the second currency, the merchant price is the least expensive.]

[146. The system of claim 143, wherein the customer selects the second currency from the plurality of currencies the merchant is willing to accept.]

[147. The system of claim 143, wherein the server selects the second currency from the plurality of currencies, wherein the merchant price is the least expensive for the selected second currency when the first currency is converted into the second currency.]

[148. The system of claim 143, wherein the first currency is selected from a plurality of currencies in which the customer has an account for each currency and the second currency is selected from a plurality of currencies the merchant is willing to accept.]

[149. The system of claim 148, wherein the customer selects the first currency from the plurality of currencies.]

[150. The system of claim 148, wherein the server selects the first currency from the plurality of currencies, wherein the selected first currency when converted into the second currency, the merchant price is the least expensive.]

[151. The system of claim 148, wherein the customer selects the second currency from the plurality of currencies the merchant is willing to accept.]

[152. The system of claim 148, wherein the server selects the second currency from the plurality of currencies, wherein the merchant price is the least expensive for the selected second currency when the first currency is converted into the second currency.]

[153. The system of claim 143, wherein the server further comprises a customer balance account associated with the customer, wherein the customer balance account comprises a customer balance in the first currency and wherein the server deducts the amount in the first currency from the balance in the customer balance account.]

[154. The system of claim 143, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[155. The system of claim 143, wherein the server further comprises a merchant balance account associated with the merchant, wherein the merchant balance account comprises a merchant balance in the second currency and wherein the server adds the converted amount in the second currency to the balance in the merchant balance account.]

[156. The system of claim 143, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[157. The system of claim 143, wherein the network is selected from the group consisting of the Internet, an intranet, and a Local Area Network (LAN).]

[158. The system of claim 143, wherein the current exchange rate is selected from the group consisting of a currency broker and a bank.]

[159. The system of claim 143, wherein the merchant sets the exchange rate.]

[160. The system of claim 143, wherein the customer computer sends a copy of the agreed price in the second currency to the server.]

[161. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept; and a server connected to the customer computer via the network and having the product price in a second currency, for receiving the first set of data, and for approving the transaction when the converted amount in the second currency is at least equal to the product price in the second currency in accordance with current exchange rates.]

[162. The system of claim 161, wherein the customer selects the first currency from the plurality of currencies in which the customer has an account for each currency.]

[163. The system of claim 161, wherein the server selects the first currency from the plurality of currencies in which the customer has an account for each currency, wherein the selected first currency when converted into the second currency, the merchant price is the least expensive.]

[164. The system of claim 161, wherein the customer selects the second currency from the plurality of currencies the merchant is willing to accept.]

[165. The system of claim 161, wherein the server selects the second currency from the plurality of currencies, wherein the merchant price is the least expensive for the selected second currency when the first currency is converted into the second currency.]

[166. The system of claim 161, wherein the first currency is selected from a plurality of currencies in which the customer has an account for each currency and the second currency is selected from a plurality of currencies the merchant is willing to accept.]

[167. The system of claim 166, wherein the customer selects the first currency from the plurality of currencies.]

[168. The system of claim 166, wherein the server selects the first currency from the plurality of currencies, wherein the selected first currency when converted into the second currency, the merchant price is the least expensive.]

[169. The system of claim 166, wherein the customer selects the second currency from the plurality of currencies the merchant is willing to accept.]

[170. The system of claim 166, wherein the server selects the second currency from the plurality of currencies, wherein the merchant price is the least expensive for the selected second currency when the first currency is converted into the second currency.]

[171. The system of claim 161, wherein the server further comprises a customer balance account associated with the customer, wherein the customer balance account comprises a customer balance in the first currency and wherein the server deducts the amount in the first currency from the balance in the customer balance account.]

[172. The system of claim 161, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[173. The system of claim 161, wherein the server further comprises a merchant balance account associated with the merchant, wherein the merchant balance account comprises a merchant balance in the second currency and wherein the server adds the converted amount in the second currency to the balance in the merchant balance account.]

[174. The system of claim 161, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[175. The system of claim 161, wherein the network is selected from the group consisting of the Internet, an intranet, and a Local Area Network (LAN).]

[176. The system of claim 161, wherein the current exchange rate is selected from the group consisting of a currency broker and a bank.]

[177. The system of claim 161, wherein the merchant sets the exchange rate.]

[178. The system of claim 161, wherein the customer computer sends a copy of the agreed price in the second currency to the server.]

[179. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept; and a server connected to the customer computer via the network and having the product price in a second currency, for receiving the first set of data, and for approving the transaction when the converted amount in the second currency is within a risk range of the product price in the second currency in accordance with current exchange rates.]

[180. The system of claim 179, wherein the customer selects the first currency from the plurality of currencies in which the customer has an account for each currency.]

[181. The system of claim 179, wherein the server selects the first currency from the plurality of currencies in which the customer has an account for each currency, wherein the selected first currency when converted into the second currency, the merchant price is the least expensive.]

[182. The system of claim 179, wherein the customer selects the second currency from the plurality of currencies the merchant is willing to accept.]

[183. The system of claim 179, wherein the server selects the second currency from the plurality of currencies, wherein the merchant price is the least expensive for the selected second currency when the first currency is converted into the second currency.]

[184. The system of claim 179, wherein the first currency is selected from a plurality of currencies in which the customer has an account for each currency and the second currency is selected from a plurality of currencies the merchant is willing to accept.]

[185. The system of claim 184, wherein the customer selects the first currency from the plurality of currencies.]

[186. The system of claim 184, wherein the server selects the first currency from the plurality of currencies, wherein the selected first currency when converted into the second currency, the merchant price is the least expensive.]

[187. The system of claim 184, wherein the customer selects the second currency from the plurality of currencies the merchant is willing to accept.]

[188. The system of claim 184, wherein the server selects the second currency from the plurality of currencies, wherein the merchant price is the least expensive for the selected second currency when the first currency is converted into the second currency.]

[189. The system of claim 179, wherein the server further comprises a customer balance account associated with the customer, wherein the customer balance account comprises a customer balance in the first currency and wherein the server deducts the amount in the first currency from the balance in the customer balance account.]

[190. The system of claim 179, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[191. The system of claim 179, wherein the server further comprises a merchant balance account associated with the merchant, wherein the merchant balance account comprises a merchant balance in the second currency and wherein the server adds the converted amount in the second currency to the balance in the merchant balance account.]

[192. The system of claim 179, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[193. The system of claim 179, wherein the network is selected from the group consisting of the Internet, an intranet, and a Local Area Network (LAN).]

[194. The system of claim 179, wherein the current exchange rate is selected from the group consisting of a currency broker and a bank.]

[195. The system of claim 179, wherein the merchant sets the exchange rate.]

[196. The system of claim 179, wherein the customer computer sends a copy of the agreed price in the second currency to the server.]

[197. A system for determining approval of a transaction between a merchant and a customer over a network, wherein the transaction includes the merchant providing a product to the customer at a product price in a second currency, wherein the product price in the second currency is known by the customer, wherein the system comprises:

a network;

a customer computer associated with a customer and connected to the network, wherein the customer computer further comprises a first set of data including a converted amount in a second currency, wherein the customer computer generates the converted amount in the second currency by converting the amount the customer agrees to pay for a product in a first amount into the converted amount in the second currency using current exchange rates, wherein the second currency is a currency the merchant is willing to accept; and a server connected to the customer computer via the network and having the product price in a second currency, for receiving the first set of data, and for approving the transaction when the converted amount in the second currency is within a payment range of the product price in the second currency in accordance with current exchange rates.]

[198. The system of claim 197, wherein the customer selects the first currency from the plurality of currencies in which the customer has an account for each currency.]

[199. The system of claim 197, wherein the server selects the first currency from the plurality of currencies in which the customer has an account for each currency, wherein the selected first currency when converted into the second currency, the merchant price is the least expensive.]

[200. The system of claim 197, wherein the customer selects the second currency from the plurality of currencies the merchant is willing to accept.]

[201. The system of claim 197, wherein the server selects the second currency from the plurality of currencies, wherein the merchant price is the least expensive for the selected second currency when the first currency is converted into the second currency.]

[202. The system of claim 197, wherein the first currency is selected from a plurality of currencies in which the customer has an account for each currency and the second currency is selected from a plurality of currencies the merchant is willing to accept.]

[203. The system of claim 202, wherein the customer selects the first currency from the plurality of currencies.]

[204. The system of claim 202, wherein the server selects the first currency from the plurality of currencies, wherein the selected first currency when converted into the second currency, the merchant price is the least expensive.]

[205. The system of claim 202, wherein the customer selects the second currency from the plurality of currencies the merchant is willing to accept.]

[206. The system of claim 202, wherein the server selects the second currency from the plurality of currencies, wherein the merchant price is the least expensive for the selected second currency when the first currency is converted into the second currency.]

[207. The system of claim 197, wherein the server further comprises a customer balance account associated with the customer, wherein the customer balance account comprises a customer balance in the first currency and wherein the server deducts the amount in the first currency from the balance in the customer balance account.]

[208. The system of claim 197, wherein a party other than the server further comprises a customer balance account associated with the customer, wherein the customer balance account comprises a customer balance in the first currency and wherein the party other than the server deducts the amount in the first currency from the balance in the customer balance account based on information provided by the server.]

[209. The system of claim 197, wherein the server further comprises a merchant balance account associated with the merchant, wherein the merchant balance account comprises a merchant balance in the second currency and wherein the server adds the converted amount in the second currency to the balance in the merchant balance account.]

[210. The system of claim 197, wherein a party other than the server further comprises a merchant balance account associated with the merchant, wherein the merchant balance account comprises a merchant balance in the second currency and wherein the party other than the server adds the converted amount in the second currency to the balance in the merchant balance account based on information provided by the server.]

[211. The system of claim 197, wherein the network is selected from the group consisting of the Internet, an intranet, and a Local Area Network (LAN).]

[212. The system of claim 197, wherein the current exchange rate is selected from the group consisting of a currency broker and a bank.]

[213. The system of claim 197, wherein the merchant sets the exchange rate.]

[214. The system of claim 197, wherein the customer computer sends a copy of the agreed price in the second currency to the server.]

[215. A method for determining approval of a transaction over a network between a customer having a customer computer connected to the network and a merchant having a merchant computer connected to the network, wherein the customer computer and the merchant computer are connected to a server via the network, wherein the method comprises:

transmitting a first set of data from a customer computer to a server, wherein the first set of data includes an amount in a first currency;

transmitting a second set of data by a merchant computer to the server; wherein the second set of data includes a product price in a second currency;

receiving the first set of data and the second set of data by the server;

converting the amount in the first currency into a converted amount in the second currency using current exchange rates; and approving the transaction by the server when the converted amount in the second currency is at least equal to the product price in the second currency.]

[216. A method for determining approval of a transaction over a network between a customer having a customer computer connected to the network and a merchant having a merchant computer connected to the network, wherein the customer computer and the merchant computer are connected to a server via the network, wherein the method comprises:

transmitting a first set of data from a customer computer to a server, wherein the first set of data includes an amount in a first currency;

transmitting a second set of data by a merchant computer to the server; wherein the second set of data includes a product price in a second currency;

receiving the first set of data and the second set of data by the server;

converting the amount in the first currency into a converted amount in the second currency using current exchange rates; and approving the transaction by the server when the converted amount in the second currency is within a payment range of the product price in the second currency.]

[217. A method for determining approval of a transaction over a network between a customer having a customer computer connected to the network and a merchant having a merchant computer connected to the network, wherein the customer computer and the merchant computer are connected to a server via the network, wherein the method comprises:

transmitting a second set of data from a merchant computer to a customer computer, wherein the second set of data includes a product price in a second currency;

receiving the second set of data by the customer computer, wherein the customer computer has a first set of data including an amount in a first currency;

transmitting the first set of data and the second set of data by the customer computer to a server;

converting the amount in the first currency into a converted amount in the second currency using current exchange rates; and approving the transaction by the server when the converted amount in the second currency is at least equal to the product price in the second currency.]

[218. A method for determining approval of a transaction over a network between a customer having a customer computer connected to the network and a merchant having a merchant computer connected to the network, wherein the customer computer and the merchant computer are connected to a server via the network, wherein the method comprises:

transmitting a second set of data from a merchant computer to a customer computer, wherein the second set of data includes a product price in a second currency;

receiving the second set of data by the customer computer, wherein the customer computer has a first set of data including an amount in a first currency;

transmitting the first set of data and the second set of data by the customer computer to a server;

converting the amount in the first currency into a converted amount in the second currency using current exchange rates; and approving the transaction by the server when the converted amount in the second currency is within a payment range of the product price in the second currency.]

[219. A method for determining approval of a transaction over a network between a customer having a customer computer connected to the network and a merchant having a merchant computer connected to the network, wherein the customer computer and the merchant computer are connected to a server via the network, wherein the method comprises:

transmitting a first set of data from a customer computer to a merchant computer, wherein the first set of data includes an amount in a first currency;

receiving the first set of data by the merchant computer, wherein the merchant computer has a second set of data including a product price in a second currency;

transmitting the first set of data and second set of data by the merchant computer to a server;

converting the amount in the first currency into a converted amount in the second currency using current exchange rates; and approving the transaction by the server when the converted amount in the second currency is at least equal to the product price in the second currency.]

[220. A method for determining approval of a transaction over a network between a customer having a customer computer connected to the network and a merchant having a merchant computer connected to the network, wherein the customer computer and the merchant computer are connected to a server via the network, wherein the method comprises:

transmitting a first set of data from a customer computer to a merchant computer, wherein the first set of data includes an amount in a first currency;

receiving the first set of data by the merchant computer, wherein the merchant computer has a second set of data including a product price in a second currency;

transmitting the first set of data and second set of data by the merchant computer to a server;

converting the amount in the first currency into a converted amount in the second currency using current exchange rates; and approving the transaction by the server when the converted amount in the second currency is within a payment range of the product price in the second currency.]

*221. A system for determining approval of a transaction between a merchant and a customer over a network, wherein the system comprises:*

*a server configured to receive over the network a first set of data and a second set of data, the first set of data including an amount a customer agrees to pay for a product in a first currency, the second set of data including a product price at which a merchant agrees to sell the product in a second currency; and to convert the amount in the first currency into a converted amount in the second currency, and to approve the transaction when the converted amount in the second currency is at least equal to the product price in the second currency in accordance with current exchange rates.*

*222. The system of claim 221, wherein the server is further configured to select the first currency from a plurality of currencies, wherein the merchant price is the least expensive for the selected first currency when converted into the second currency.*

*223. The system of claim 221, wherein the server is further configured to select the second currency from a plurality of currencies, wherein the merchant price is the least expensive for the selected second currency when the first currency is converted into the second currency.*

*224. The system of claim 221, wherein the server is further configured to select the first currency from a plurality of currencies in which the customer has an account for each currency and to select the second currency from a plurality of currencies the merchant is willing to accept.*

*225. The system of claim 221, wherein the server is further configured to store a customer balance account associated with the customer, wherein the customer balance account comprises a customer balance in the first currency and wherein the server is configured to deducts the amount in the first currency from the balance in the customer balance account.*

*226. The system of claim 221, wherein the server is further configured to store a merchant balance account associated with the merchant, wherein the merchant balance account comprises a merchant balance in the second currency and wherein the server is configured to add the converted amount in the second currency to the balance in the merchant balance account.*

*227. The system of claim 221, wherein the server is further configured to select the current exchange rate from the group consisting of a currency broker and a bank.*

*228. The system of claim 221 wherein the server is further configured to calculate a session total in the first currency and a session limit for the customer in the first currency, wherein the server is further configured to approve the transaction when the converted amount in the second currency is at least equal to the product price in the second currency in accordance with current exchange rates and when the customer amount in the first currency is added to the session total, the session total is less than or equal to the session limit.*

*229. The system of claim 228 wherein the session limit is set by the customer.*

*230. The system of claim 228 wherein the session limit is set by the server.*

*231. A method for determining approval of a transaction over a network connection between a customer having a customer computer connected to the network and a merchant having a merchant computer connected to the network, wherein the customer computer and the merchant computer are connected to a server via the network, wherein the method comprises:*

*receiving a first set of data from the customer computer to the server, the first set of data including an amount in a first currency;*

*receiving a second set of data from the merchant computer to the server, the second set of data including a product price in a second currency;*

*converting the amount in the first currency into a converted amount in the second currency using current exchange rates; and*

*approving the transaction by the server if the converted amount in the second currency is within a payment range of the product price in the second currency and if the amount in the first currency added to a session total for the customer is less than or equal to a session limit for the customer.*

*232. The method of claim 231 wherein the session limit is set by the customer.*

*233. The method of claim 231 wherein the session limit is set by the server.*

*234. The method of claim 231, wherein the customer selects the first currency from the plurality of currencies in which the customer has an account for each currency.*

*235. The method of claim 231, wherein the first currency is selected from a plurality of currencies in which the customer has an account for each currency and the second currency is selected from a plurality of currencies the merchant is willing to accept.*

*236. The method of claim 235, wherein the server selects the first currency from the plurality of currencies, wherein the selected first currency when converted into the second currency, the merchant price is the least expensive.*

*237. The method of claim 235, wherein the customer selects the second currency from the plurality of currencies the merchant is willing to accept.*

*238. The method of claim 235, wherein the server selects the second currency from the plurality of currencies, wherein the merchant price is the least expensive for the selected second currency when the first currency is converted into the second currency.*

*239. The method of claim 231, wherein the server stores a customer balance account associated with the customer, wherein the customer balance account comprises a customer balance in the first currency and wherein the server deducts the amount in the first currency from the balance in the customer balance account.*

*240. The method of claim 231, wherein the server stores a merchant balance account associated with the merchant, wherein the merchant balance account comprises a merchant balance in the second currency and wherein the server adds the converted amount in the second currency to the balance in the merchant balance account.*

* * * * *